(12) United States Patent  
Hines (10) Patent No.: US 9,280,577 B1  
(45) Date of Patent: Mar. 8, 2016

(54) METHOD FOR NORMALIZING MEDIA METADATA

(71) Applicant: Google Inc., Mountain View, CA (US)

(72) Inventor: George Hines, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 449 days.

(21) Appl. No.: 13/913,245

(22) Filed: Jun. 7, 2013

(51) Int. Cl.  
*G06F 17/00* (2006.01)  
*G06F 17/30* (2006.01)

(52) U.S. Cl.  
CPC .... *G06F 17/30371* (2013.01); *G06F 17/30772* (2013.01)

(58) Field of Classification Search  
CPC ............... G06F 17/30772; G06F 17/30371  
USPC ................................................. 707/690, 691  
See application file for complete search history.

(56) References Cited

U.S. PATENT DOCUMENTS

| | | | | |
|---|---|---|---|---|
| 6,993,532 B1* | 1/2006 | Platt et al. | ......... | G06F 17/30743 707/736 |
| 2003/0221541 A1* | 12/2003 | Platt | .................. | G06F 17/30038 84/609 |
| 2004/0034650 A1* | 2/2004 | Springer, Jr. et al. | ................. | G06F 17/30038 707/999.102 |
| 2006/0254409 A1* | 11/2006 | Withop | ............. | G06F 17/30029 84/601 |
| 2007/0214130 A1* | 9/2007 | Miller | ............... | G06F 17/30265 707/999.005 |
| 2009/0112831 A1* | 4/2009 | Gupta et al. | ...... | G06F 17/30038 707/999.004 |
| 2011/0289094 A1* | 11/2011 | Fisher | ................. | G06F 17/3002 707/748 |

* cited by examiner

*Primary Examiner* — Phong Nguyen  
(74) *Attorney, Agent, or Firm* — Morris & Kamlay LLP (57) ABSTRACT

In a computer-implemented method for normalizing media metadata, a directory containing media (e.g., music) files, which have metadata, is accessed. The metadata associated with the music files is accessed. The metadata for the music files is checked for an artist name in a "last name, first name" format, for a mixed up track title and artist name, and for artists that appear in multiple genres. Using approximate string matching, the metadata is checked to identify potential matches for known artists with other known artists in a database, and to identify approximate matches for a combination of the artist name and an album. In the event an operation identifies an error or inconsistency in the metadata, a report is generated. Further, a report of all unique artists and albums found in the metadata is generated.

20 Claims, 6 Drawing Sheets

METHOD FOR NORMALIZING MEDIA METADATA

BACKGROUND

Media files (music, video, photographs, etc.) have metadata or "tags" that describe what is in the file. For music files, the tags typically include the name of the artist, the music genre, the track title, etc. In the case of large music collections, incorrect or inconsistent tagging can be a significant problem. One can easily end up with files that are either duplicated within the collection or nearly impossible to find within the collection.

For example, consider the rock band named "Blue Öyster Cult." In a large music collection, some albums by this artist could be tagged as "Blue Oyster Cult" (without the umlaut), "BÖC (with the umlaut), "BOC" (without the umlaut), or even as "B.O.C." As a consequence of such inconsistent tagging, some "Blue Öyster Cult" albums could be duplicated within the collection and other "Blue Öyster Cult" albums could be difficult to find within the collection.

It is in this context that embodiments arise.

SUMMARY

In an example embodiment, a computer-implemented method for normalizing media (e.g., music) metadata is provided. In this method, a directory containing music files, each of which has metadata associated therewith, is accessed. The metadata associated with the music files is accessed. For the metadata associated with the music files, the following operations are performed: checking the metadata for an artist name in a "last name, first name" format; checking the metadata for a mixed up track title and artist name; and checking the metadata for artists that appear in multiple genres. Using approximate string matching, the metadata is checked to identify potential matches for known artists with other known artists in a reference database, and to identify approximate matches for a combination of the artist name and an album. When one of the operations identifies an error or inconsistency in the metadata, a report is generated. Further, a report of a final list of all unique artists and all unique albums found in the metadata associated with the music files is generated.

In one embodiment, the method includes checking a binary checksum of raw media data in the music files for duplicates and generating a report of any duplicates found. In one embodiment, the method includes detecting missing auxiliary metadata associated with the music files and generating a report if any missing auxiliary metadata is detected. In one embodiment, the missing auxiliary metadata includes a cover art image for an album folder In one embodiment, the method includes detecting formatting issues within the metadata for the music files and generating a report identifying any formatting issues detected. In one embodiment, the method includes using a set of string transformations to compare two non-equivalent strings. In one embodiment, the method includes comparing the metadata for a music file to a location of the music file in a file system. In one embodiment, the method includes collecting the metadata for the music files for analysis.

In another example embodiment, a non-transitory computer-readable media is provided. The computer-readable media stores a program which, when executed, instructs a processor to access a directory containing music files, each of which has metadata associated therewith, to access the metadata associated with the music files. For the metadata associated with the music files, the program instructs the processor to check the metadata for an artist name in a "last name, first name" format, to check the metadata for a mixed up track title and artist name, and to check the metadata for artists that appear in multiple genres. Further, the program instructs the processor, using approximate string matching, to check the metadata to identify potential matches for known artists with other known artists in a reference database, and to check a combination of the artist name and an album in the metadata for approximate matches. When one of the operations identifies an error or inconsistency in the metadata, the program instructs the processor to generate a report. The program also instructs the processor to generate a report of a final list of all unique artists and all unique albums found in the metadata associated with the music files.

In yet another example embodiment, another computer-implemented method for normalizing media (e.g., music) metadata is provided. This method includes accessing a directory containing music files, with each of the music files having metadata associated therewith. The method also includes checking raw media data in the music files for duplicates and generating a report of any duplicates found, detecting missing auxiliary metadata associated with the music files and generating a report if any missing auxiliary metadata is found, detecting formatting issues within the metadata for the music files and generating a report identifying any formatting issues detected, comparing the metadata for a music file to a location of the music file in a file system and generating a report if any errors or inconsistencies are found, and collecting the metadata for the music files for analysis. The method further includes accessing the metadata collected for analysis, checking the metadata associated with the music files, using approximate string matching, to identify potential matches for known artists with other known artists in a reference database, and generating a report of a final list of all unique artists and all unique albums found in the metadata associated with the music files.

In one embodiment, the checking of the raw media data in the music files for duplicates includes checking a binary checksum of the raw media data in the music files for duplicates. In one embodiment, the method further includes, for the music files, checking the metadata for an artist name in a "last name, first name" format, checking the metadata for a mixed up track title and artist name, and checking the metadata for artists that appear in multiple genres. In one embodiment, a report is generated when one of the checking operations identifies an error or inconsistency in the metadata.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

The method for normalizing media metadata described herein can be used to normalize the metadata associated with various media files, e.g., music files, video files, picture files, etc. In one embodiment, the method is implemented by software; however, it will be appreciated that the method also can be implemented by hardware or firmware. In the following examples, the normalizing of metadata associated with music files (e.g., mp3, aac, m4a, flac, ogg, etc.) is described. To normalize the metadata for music files, the software first allows the user to select a directory containing music files for analysis. The software then proceeds through a series of ordered operations and provides various reports as the operations are carried out. The reports are arranged in a manner that allows the user to correct problems that might help improve the accuracy/efficacy of later operations. Examples of the reports generated by the software are set forth in the Appendix. In the course of analyzing the music files, the software makes multiple passes through the list of music files, as will be explained in more detail below.

To enable the software to be effective in a variety of situations, the software has a number of configurable parameters. In one embodiment, the software has nine (9) configurable parameters. The first parameter is "ignore upper/lower case" and the value of this parameter is either true or false. If true, then mismatches when comparing file system names versus metadata are ignored with regard to upper/lower case. In some operating systems (e.g., Windows), case differences often do not matter. The second parameter is "illegal/disallowed characters in the native file system" and the value of this parameter is a set of such characters. For example, in Windows operating systems, characters such as "?," "*," "/," etc. are not allowed in file names. Thus, any characters in the set of illegal/disallowed characters that exist in the metadata are treated specially. In particular, these characters are mapped to another set of substitute characters (e.g., "_," ".," "-," etc.). This allows file names to still be checked for reasonable values when they contain illegal characters. The third parameter is a "check for trailing periods in file names" and the value of this parameter is either true or false. In Windows operating systems, file names cannot end in a period, whereas metadata representing an album, artist, or track might end in a period. This flag causes the software to allow a match between metadata and a file name if the only difference between the two is a trailing period.

The fourth parameter is "ignore certain genres when looking for artists in multiple genres" and the value of this parameter is a set of genres. In one embodiment, the set of genres includes soundtracks, compilations, Christmas, Holiday, etc.

The fifth parameter is "short or common words to ignore when comparing album titles" and the value of this parameter is a set of such words. In one embodiment, the set of short or common words includes "a," "an," "the," "and," "of," "los," "el," "la," "with," "remastered," "disc," "vol," "disk," etc. The sixth parameter is "ignore double spaces" and the value of this parameter is either true or false. If true, then multiple spaces or tabs are considered to be the equivalent of a single space for the purposes of comparing metadata. The seventh parameter is "ignore spaces at the beginning or end of metadata" and the value of this parameter is either true or false. This parameter allows the software ignore spaces at either end of a particular field of metadata. Moreover, this parameter is related to the previous parameter ("ignore double spaces") as it further relaxes the constraint that metadata fields and file names (or folder names) must match exactly.

The eighth parameter is "minimum artist name length" and the value of this parameter can be set to any desired length. In one embodiment, the value is set to a length of five (5) characters. This parameter sets the smallest length of an artist name allowed when using approximate string matching. On the one hand, it is easier to mistakenly match short artist names and therefore the inclusion of such short names can unacceptably increase the number of false positives detected when searching for misspelled artist names. On the other hand, setting this parameter to a higher value reduces the number of false positive matches, but can also prevent typographical errors from being found in artists with short names. The five-character value selected in the example embodiment is considered to represent a reasonable trade off because shorter artist names are probably less likely to have typographical errors. The ninth parameter is the "allowable differences between approximate matching of artist names" and the value of this parameter is a percentage. In one embodiment, the value of this parameter is set at 5%. As discussed with regard to the previous value (the "minimum artist name length"), increasing the value of this parameter gives the software more freedom to find potentially mistyped artist names, but also increase the likelihood of false positive matches. It will be appreciated that the percentage selected as the value for this parameter can be varied to suit the needs of particular applications (e.g., 2%, 8%, 10%, etc.).

Figure 1A:
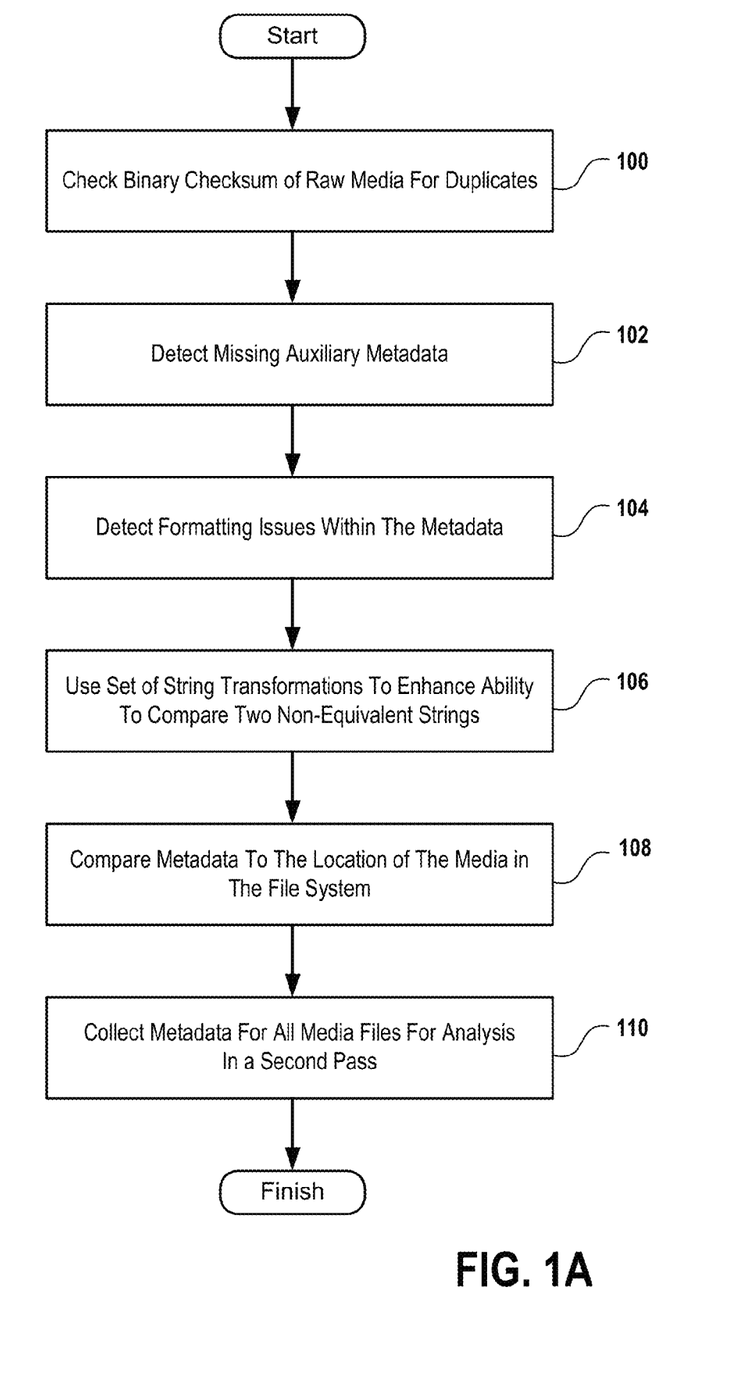
FIG. 1A is a flowchart diagram illustrating the method operations performed in a first pass through a list of media files to detect problems associated with file integrity, missing auxiliary data, and precisely duplicated data, in accordance with an example embodiment.

FIG. 1A is a flowchart diagram illustrating the method operations performed in a first pass through the list of media files to detect problems associated with file integrity, missing auxiliary data, and precisely duplicated data, in accordance with an example embodiment. In operation 100, the software checks the binary checksum (CRC) of the raw media data for duplicates. This operation will detect a duplicate irrespective of the metadata for the media file, e.g., the metadata can be a match or the metadata can be completely different. For example, two media files could contain identical copies of the same music track even though the metadata indicates that the files are somehow different. If the actual media is the same, then the metadata for at least one of the media files must be incorrect. In operation 102, the software detects missing auxiliary metadata. By way of example, the missing auxiliary metadata can be art work and logs. In one embodiment, the software determines whether an album folder should include a cover art image. In operation 104, the software detects formatting issues within the metadata. This operation involves checking to determine whether the metadata is internally and externally consistent for the type of media file being checked. Examples of formatting issues that can cause inconsistencies in the metadata include control characters (unprintable/unreadable letters) in the artist or album names, unexpected white space, and improperly quoted strings. In addition, if the metadata references require external files, the software confirms that those external files exist.

The method continues with operation 106 in which the software uses a set of string transformations to enhance the ability to compare two non-equivalent strings with a high degree of accuracy. When a match is found, it is highly likely that duplicate media have been detected. In one embodiment, the set of string transformations includes the transformations shown in FIG. 1B. It will be appreciated that the set of string transformations can be used any time during the first pass through the list of media files. In operation 108, the software compares the metadata to the location of the media within the file system. By making this comparison, if the user intended to organize the media files of a given artist within a single folder, organizational errors can be detected. In particular, the software can detect whether the media file is located in the wrong folder (or potentially that the metadata is incorrect). It will be appreciated that media files of a given artist need not be organized within a single folder and that a user can choose to organize their media files in any manner they see fit. In the event that the user elects not to organize the media files of a given artist within a single folder, the comparison operation can either be modified in accordance with the organization scheme chosen by the user or omitted from the method.

In operation 110, the software collects the metadata for all the media files so that these files can be analyzed in a second pass. As will be explained in more detail below, the second pass uses the size of the data to improve the accuracy of later checks. In other words, the larger and more complete the list of metadata (e.g., artist names), the more likely errors can be detected. With access to an authoritative data source, the accuracy that can be obtained is even higher. Once the metadata for all the media files has been collected for the second pass, the first pass through the list of media files is finished.

Figure 1B:
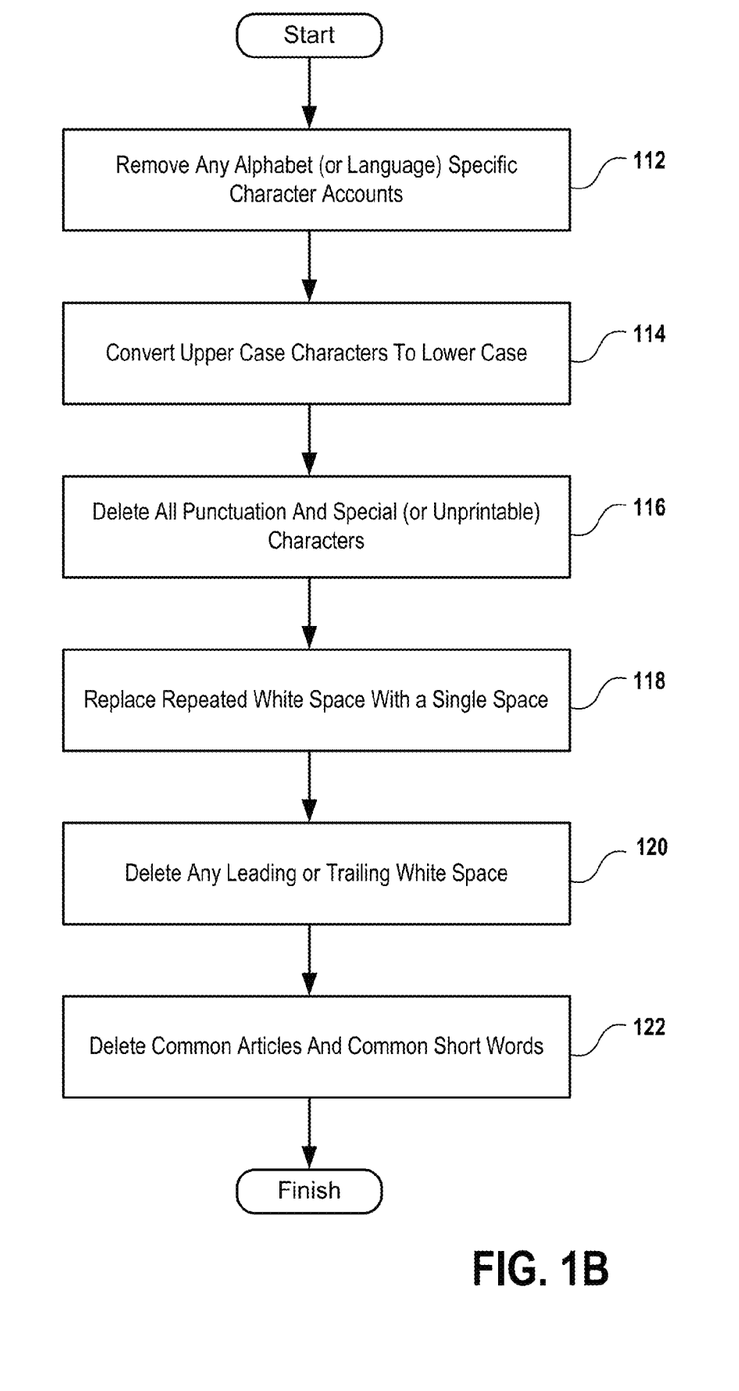
FIG. 1B is a flowchart diagram illustrating a set of string transformations that is used to enhance the ability to compare two non-equivalent strings with a high degree of accuracy, in accordance with an example embodiment.

FIG. 1B is a flowchart diagram illustrating a set of string transformations that is used to enhance the ability to compare two non-equivalent strings with a high degree of accuracy, in accordance with an example embodiment. In operation 112, the software removes any alphabet (or language) specific character accents. Examples of character accents to be removed include tildes in Spanish (e.g., "ñ" changed to "n") and umlauts in German (e.g., "ö" changed to "o"). With the accents stripped, the string contains only traditional Roman alphabet characters. In operation 114, the software converts the upper case characters to lower case characters. In operation 116, the software deletes all punctuation and special (or unprintable) characters. In operation 118, the software replaces any repeated white space with a single white space. In operation 120, the software deletes any leading or trailing white space. In operation 122, the software removes any common articles (e.g., "the") and common short words (e.g., "a," "an," "and," "los," "el," "la," "with," "disc," "disk," "vol," "of," etc.). The set of transformations in operations 112-122 transforms the strings in a manner that makes them easy to compare without altering their ability to represent the original artist or album. Once these transformations are done, it is programmatically easier to spot duplicate album names, duplicate artist names, and common mistyped/inconsistent artist names. It will be appreciated, however, that these transformations do not enable more complex mistakes in the metadata to be detected (e.g., missing/extra letters and misspellings). These more complex problems are detected in a subsequent pass once the complete database of metadata is available for comparison.

Figure 2:
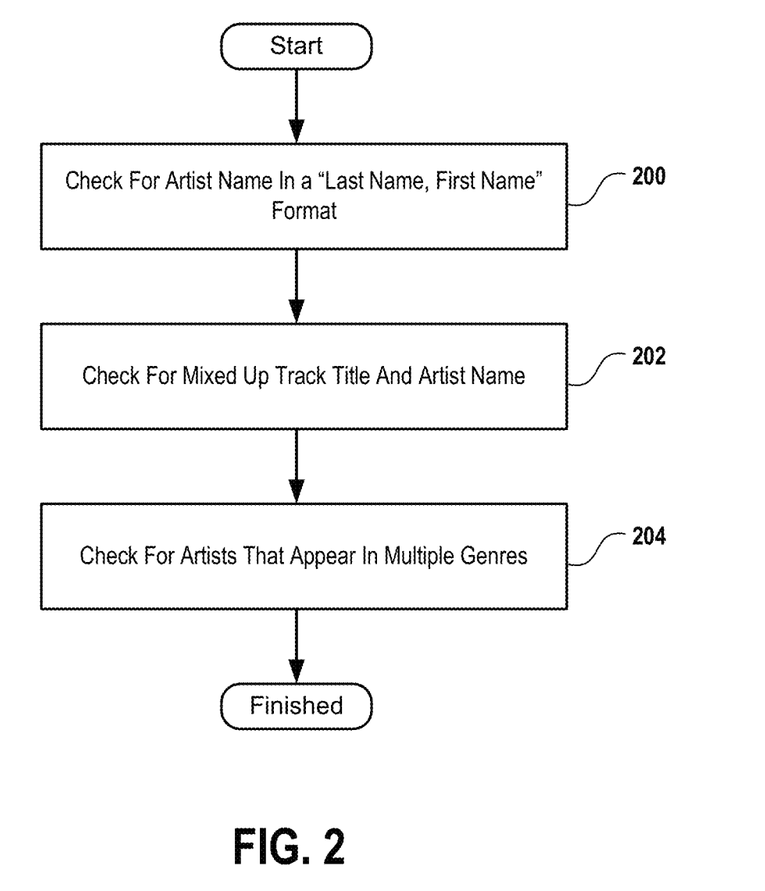
FIG. 2 is a flowchart diagram illustrating the method operations performed in a second pass through the list of media files to reexamine the metadata and perform additional checks, in accordance with an example embodiment.

FIG. 2 is a flowchart diagram illustrating the method operations performed in a second pass through the list of media files to reexamine the metadata and perform additional checks, in accordance with an example embodiment. In operation 200, the software checks the metadata for the artist name in "last name, first name" format. This check can be done by looking for a single comma in the artist name and transposing the name. In one embodiment, to improve the accuracy of this check, only names including one or two words before the comma, and with a maximum of four (4) words total, are considered. The artist name can then be compared with the existing (internal) database of known artist names. The same string transformations described above with reference to FIG. 1B can be used to improve the accuracy of the match, as well as to catch typographical errors at the same time. In operation 202, the software checks the metadata for any mixed up track titles and artist names. This can be done by looking for sequences of words in the track titles (separated by common punctuation characters) that match known artist names. If an album is found to contain more than a selected threshold of matches, then it is assumed that the user has switched up the track title and the artist name in the metadata. In one embodiment, the selected threshold is three (3) tracks that match the artist's name. In operation 204, the software checks the metadata for artists that appear in multiple genres. This operation is performed for the benefit of users that want to make sure that an artist is consistently catalogued by genre (and therefore can be omitted by users who are not concerned with consistently cataloguing artists by genre). In this operation, any artist that appears in multiple genres is reported and any genres that are not considered to define an artist (e.g., the compilation genre) are excluded. In one embodiment, an authoritative source (e.g., allmusicguide.com) is checked to check to confirm the genres for correctness. Once the metadata has been checked for artists that appear in multiple genres, the second pass through the list of media files is finished.

The checks performed in the first and second passes are configured to detect the more straightforward errors that can occur in the metadata. Once the software has performed these checks, and the user has corrected any errors that were detected, the software can address the types of errors in the metadata that are more difficult to detect. In one embodiment, the software uses approximate string matching to find the types of errors in the metadata that are more difficult to detect and uses the previously corrected metadata as a basis for comparison.

Figure 3:
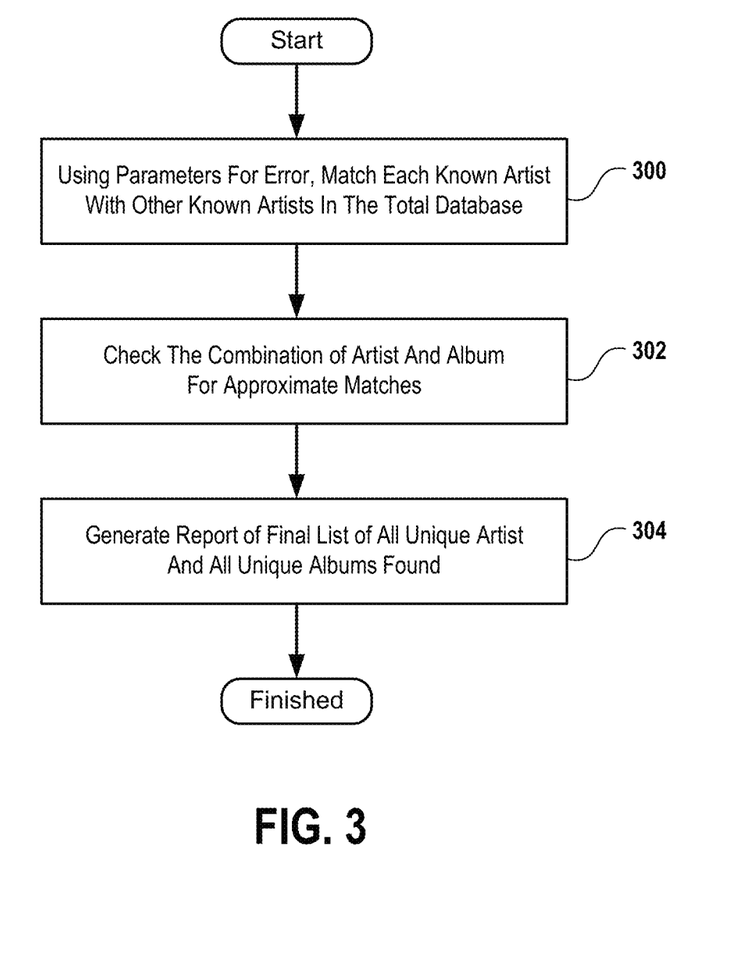
FIG. 3 is a flowchart diagram illustrating the method operations performed in checking the metadata using approximate string matching, in accordance with an example embodiment.

FIG. 3 is a flowchart diagram illustrating the method operations performed in checking the metadata using approximate string matching, in accordance with an example embodiment. In operation 300, the software attempts to match each known artist with other known artists in the reference database, using the selected parameters for error. In one embodiment, the parameters for error include a 5% error tolerance in names longer than five (5) characters. If one or more matches are found, then the software reports that there is a potential match. The existence of a potential match (as opposed to an actual match) is reported because approximate string matching is not precise. As such, it is important to provide the user with a choice as to whether or not to correct any match identified in this operation. In operation 302, the software checks the combination of the artist name and the album title for approximate matches. As described above, the artist names have already been checked for typographical errors or inconsistencies. This operation is useful because non-identical albums may differ by only a single character of the album title (e.g., Vol. 1, Vol. 2, etc.). Further, this operation can check for missing (or incorrectly tagged) volumes in a multi-volume set. In operation 304, the software generates a report containing a final list of all unique artists and all unique albums found. In one embodiment, the software generates the final list in a special sorted order. In one embodiment, the artist and album data is printed in the order defined by the same string transformations described above to increase the likelihood of spotting a match (see FIG. 1B). In this way, the order of the final list is not affected by upper/lower case letters and other comparable parameters. By scanning the final list, a user can detect any remaining errors that might have been missed during the checking process. It will often be easy for users to spot errors in the final list because duplicates will be located next to each other. Once the final list is generated, the method operations associated with approximate string matching are finished.

Figure 4:
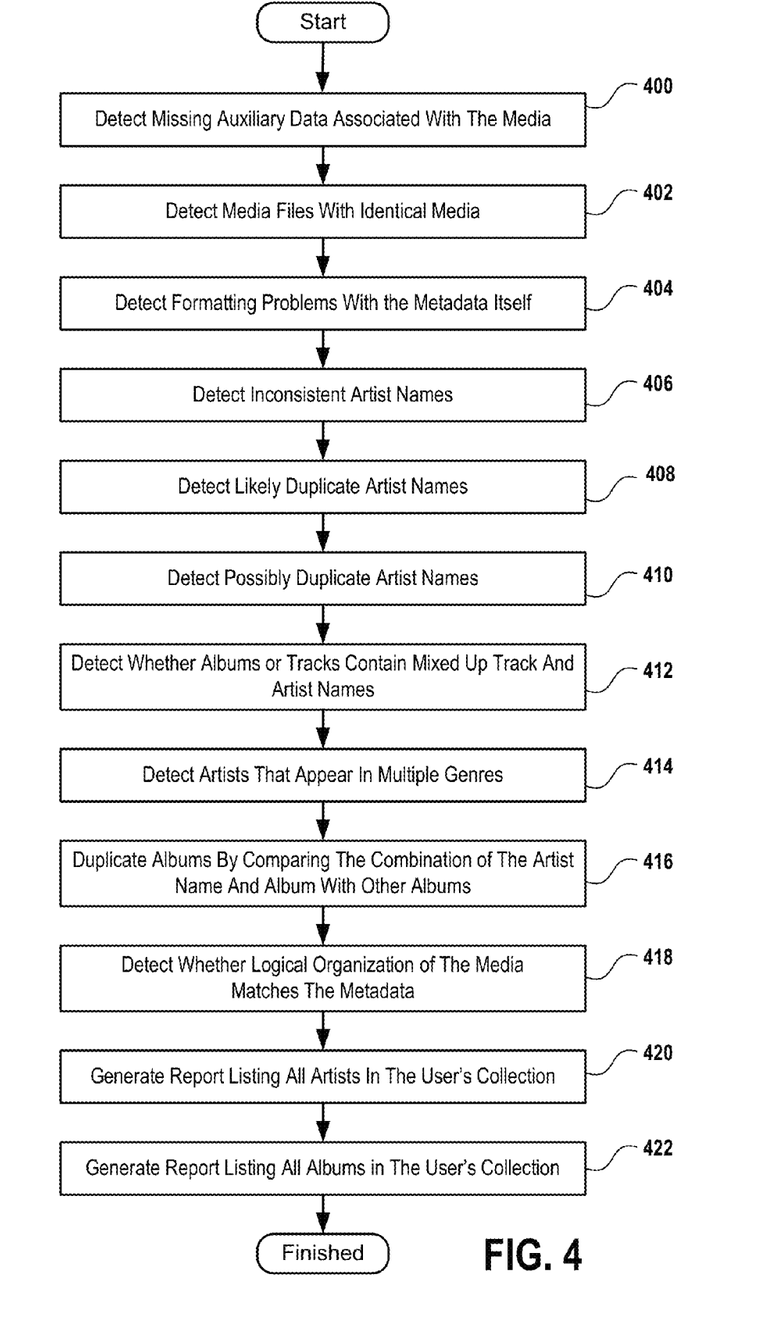
FIG. 4 is a flowchart diagram summarizing the processes described with reference to FIGS. 1A-3 and illustrating the method operations performed in normalizing the metadata for a media file, in accordance with an example embodiment.

FIG. 4 is a flowchart diagram summarizing the processes described above with reference to FIGS. 1A-3 and illustrating the method operations performed in normalizing the metadata for a media file, in accordance with an example embodiment. In operation 400, the software detects any missing auxiliary data associated with the media. By way of example, folders for mp3 albums often contain an image of the cover for the album. If this image is missing, then the software obtains the image from an appropriate source, e.g., an album art library available on the Internet. It will be appreciated that this operation is optional and therefore can be omitted if the user is not interested in making sure that the auxiliary data associated with the media is complete. In operation 402, the software detects media files with identical media. In this operation, the metadata is ignored and the raw media is checked for duplicates. In one embodiment, the software performs a binary checksum (CRC) of the raw media to check for duplicates. This enables the software to determine whether two media files contain identical copies of the same musical track even though the metadata indicates that the files are somehow different. If the actual media is identical, then it follows that the metadata for at least one of the files is incorrect. In operation 404, the software detects formatting problems with the metadata itself. In particular, the software checks to make sure that the metadata is internally and externally consistent for the type of media file. At this stage, the software does not try to check any actual values of the metadata. Examples of the formatting problems that the software can detect include control characters (unprintable/unreadable letters), inconsistently quoted strings, etc. In the event the metadata references external files, the software confirms that those external files exist.

The method proceeds in operation 406 in which the software detects inconsistent artist names. In one embodiment, this operation includes detecting an artist name formatted as "last name, first name" versus "(first name) (last name)," assuming the user has a preference for one format or the other. This operation also can include transposing a leading "the" contained in an artist's name and adding a ", the" at the end. This is useful to detect inconsistently named artists such as "Beatles, the" versus "The Beatles." Further, the software also can check to determine whether an artist's name is unreasonably short or contains only unprintable characters, as both of these scenarios indicate that the artist's name likely is incorrect. In operation 408, the software detects artist names that are likely duplicates. In one embodiment, the software detects typographical errors that include dropping character accents, capitalization errors, extra spaces in names, extraneous short words, etc. In operation 410, the software detects possibly duplicate artist names. In one embodiment, once the problems identified in the previous operations have been corrected, the software uses approximate string matching to detect artist names that might be wrong. In operation 412, the software detects whether albums or tracks contain mixed up track and artist names. This problem typically occurs in the metadata associated with compilation albums. In operation 414, the software detects artists that appear in multiple genres. For the benefit of users who prefer to consistently categorize artists, the software reports artists that are found in more than one genre (while ignoring combination genres like soundtracks, etc.). In operation 416, the software detects duplicate albums by comparing the combination of the artist name and the album with other albums in the user's collection.

Once the metadata has been corrected, the software detects, in operation 418, whether logical organization of the media matches the metadata. For example, a user might prefer to store all albums by the same artist in the same folder. This not only makes albums easier to find but also makes duplicates easier to spot. If the software detects that the logical organization of the media does not match the metadata, then this indicates that there is an organizational error or that the metadata is wrong. As such, the software generates a report so that the user is afforded the opportunity to make appropriate corrections.

In operation 420, the software generates a report listing all of the artists in the user's collection. In operation 422, the software generates a report listing all of the albums in the user's collection. In the event that the checks executed by the software fail to find duplicate or inconsistent data, the reports generated in operations 420 and 422 make it easier for the user to spot any remaining errors because any duplicate data will likely be ordered next to each other. Once the reports listing all of the artists and albums in the user's collection are generated, the method is finished.

As the software proceeds through the operations in the method for normalizing the metadata, the software provides reports to the user. These reports bring potential duplicate files and other errors and inconsistencies in the metadata to the attention of the user and allow the user to take appropriate corrective action (e.g., delete a duplicate media file, correct a typographical error in the metadata, etc.). Examples of the reports are set forth in the Appendix. It is noted that Example Reports A-I shown in the Appendix generally correspond to method operations 400-416, respectively, described above with reference to FIG. 4. In the example embodiment described herein, the software does not make any corrections automatically. This allows the user to retain full control over the changes made to the metadata for each media file and the deletion of any duplicate media files. It will be appreciated that the software could be coded to automatically perform at least some of the metadata corrections described herein.

The methods for normalizing media metadata described herein can be used in connection with existing software programs for managing local (e.g., user owned) media to help users find and clean up the metadata in their media collections. Examples of client-side software programs for managing local media include Apple's iTunes, Logitech's Media Server, Winamp, and Microsoft's Windows Media Player. Additionally, the methods for normalizing media metadata described herein can be used in connection with cloud-based media storage services either before or after a user's media has been uploaded to the cloud service. Examples of cloud-based media storage services include Apple's iTunes (iCloud), Amazon Cloud Drive, and Google Play.

Figure 5:
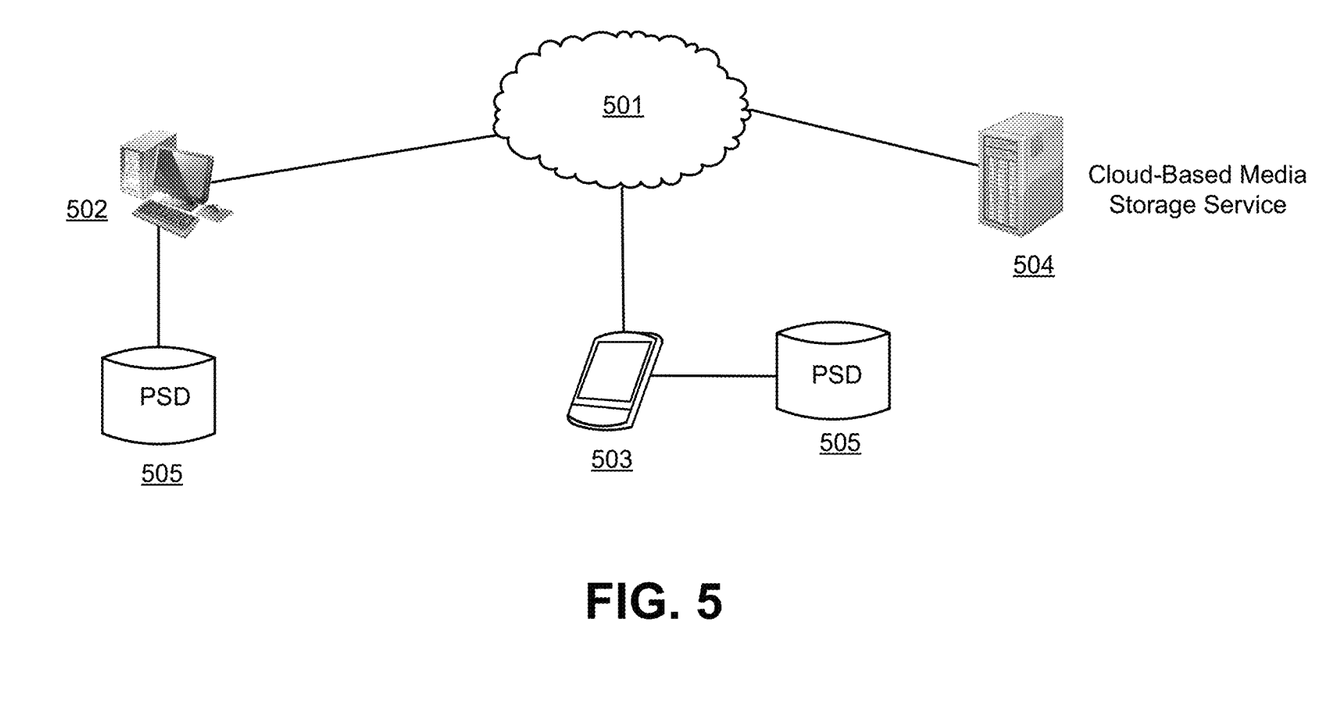
FIG. 5 is a network diagram, in accordance with an example embodiment.

FIG. 5 is a network diagram, in accordance with an example embodiment. As shown in this figure, two client devices (502 and 503) are connected to a network 501 (e.g., a wide area network (WAN) such as the Internet). A cloud-based media storage service 504 also is connected to network 501. It will be appreciated that some or all of the connections either to network 501 or within network 501 might be wireless in whole or in part. Client device 502 might be a relatively non-mobile computing device such as a desktop or a laptop. The software running on client device 502 might include: (1) an operating system or other software platform for running application programs; and (2) a web browser, which runs on or is part of the operating system. Client device 503 might be a mobile computing device such as a smartphone or a tablet computer. The software running on client device 503 might include: (1) an operating system or other software platform for running application programs including apps; and (2) a web browser or web-browsing app that runs on or is part of the operating system.

Client devices 502 and 503 might be used to play local media (e.g., music files) using client-side software programs (e.g., Apple iTunes, Logitech's Media Server, Winamp, and Microsoft's Windows Media Player). The local media (e.g. music files) might be stored on client devices 502 and 503 (e.g., on a hard disk or solid-state drive) or on a peripheral storage device 505 connected to the client device. As mentioned above, the methods for normalizing media metadata described herein can be incorporated into the client-side software programs used to manage and play the local media (e.g., music files).

Client devices 502 and 503 also might be used to play media (e.g., music files) using cloud-based media storage service 504. As noted above, examples of cloud-based media storage services include Apple's iTunes (iCloud), Amazon Cloud Drive, and Google Play. These cloud-based media storage services allow a user to upload media (e.g., music files) to the cloud service so that the media can be played by multiple client devices. As is well known, the media (e.g., music files) stored on cloud-based storage service 504 might be played by streaming to the client device or might be downloaded to the client device. As mentioned above, the methods for normalizing media metadata described herein can be incorporated into cloud-based media storage services either before or after a user's media has been uploaded to the cloud service.

Some portions of the disclosure describe algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like.

Furthermore, it is also convenient at times, to refer to certain arrangements of steps requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the context, descriptions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the example embodiments include process steps and instructions described herein in the form of an algorithm. It should be noted that the process steps and instructions of the example embodiments could be embodied in software, firmware, or hardware, and when embodied in software, could be downloaded to reside on and be operated from different platforms used by a variety of operating systems. Some example embodiments also relate to an apparatus for performing the operations described in the disclosure. This apparatus might be specially constructed for the required purposes, or it may comprise a general-purpose computer selectively activated or reconfigured by a computer program stored in the computer. Such a computer program might be stored in a computer-readable storage medium, such as, but is not limited to, any type of disk including floppy disks, optical disks, CO-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Furthermore, one or more of computers referred to in the disclosure might include a single processor or might be architectures employing multiple processor designs for increased computing capability. The algorithms and/or displays described in the disclosure are not inherently related to any particular computer or other apparatus. Various general-purpose systems may also be used with programs in accordance with the teachings described in the disclosure, or it might prove convenient to construct more specialized apparatuses to perform the described method steps.

In addition, the example embodiments in the disclosure are not described with reference to any particular programming language. It will be appreciated that a variety of programming languages might be used to implement the example embodiments.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

APPENDIX

Example Report A

Missing Auxiliary Data

Warning: no album artwork
path: "/Jazz/Various/Tower Records Original Jazz Classics"
Warning: no compressed audio files
path: "/Soundtrack/Various/Happy Feet"

Example Report B

Detect Binary Duplicates

Warning: Possible duplicate flac: Identical CRC values:
path #1/Jazz/Wayne Horvitz And Robin Holcomb/Solos
path #2/Jazz/Robin Holcomb & Wayne Horvitz/Solos

Example Report C

Detect Formatting or Other Problems with the Metadata

Warning: white space at ends of quoted string
string: PERFORMER "k.d. lang"
Warning: control or tab (non-printable) character
string: TITLE "/Groovin' High" (note: there is a tab character in the empty space)
path: "/Jazz/Bud Powell/Live at the Blue Note' Cafe, Paris 1961"
Warning: badly quoted string
string: TITLE "String Quartet No. 1 in D major Op.11/I. Moderato e simplice"
path: "/Classical/Pyotr Il'yich Tchaikovsky/Tchaikovsky String Quartets Nos_ 1 and 3"
Warning: double white space in quoted string
string: TITLE "V. Rondeau. Allegro assai" (note: the double white space appears after "V.")
path: "/Classical/Mozart-Orpheus Chamber Orchestra/Mozart_ Serenata Notturna, 2 Divertimenti"
Warning: 'disk' in album name, do you mean 'disc'?
path: "/Blues/Various/Alligator Records—30th Anniversary Collection (Disk 1 of 2)—In The Studio"

Example Report D

Detect Inconsistent Artist Names

Warning: Possible artist format of 'lastname, firstname' or 'band name, the'
artist: "Chandelles, The"
path: "/Rock/Various/Lost Legends Of Surf Guitar—Volume 01—Big Noise From Waimea!"
Warning: Possible artist format of 'lastname, firstname' or 'band name, the'
artist: "Moles, Gene"
path: "/Rock/Various/Lost Legends Of Surf Guitar—Volume 02—Point Panic"
Warning: too short or no alphanumerics in artist name: "!!!"
path: "/Indie/Various/Live at KEXP—Volume 4"

Example Report E

Detect Duplicate Artist Names

Warning: possible mistyped artist
artist #1: Blue Oyster Cult
artist #2: Blue Öyster Cult
path #1: "/Rock/Blue Oyster Cult/The Essential Blue Oyster Cult"
path #2: "/Rock/Blue +ûyster Cult/Don't Fear The Reaper_ The Best of Blue +ûyster Cult"
Warning: possible mistyped artist
artist #1: Duke Ellington and His Orchestra
artist #2: Duke Ellington And His Orchestra
path #1: "/Jazz/Various/Ken Burns Jazz_ The Story of America's Music (Disc 1 of 5)"
path #2: "/Jazz/Various/Ken Burns Jazz_ The Story of America's Music (Disc 5 of 5)"
Warning: possible mistyped artist
artist #1: Jesters, The
artist #2: The Jesters
path #1: "/Rock/Various/Lost Legends Of Surf Guitar—Volume 01—Big Noise From Waimea!"
path #2: "/Rock/Various/The Sun Records Collection Disc 3"
Warning: possible mistyped artist
artist #1: Eagles
artist #2: The Eagles
path #1: "/Country/Eagles/Long Road Out Of Eden [Disc 2]
path #2: "/Rock/The Eagles/The Long Run"
Warning: possible mistyped artist
artist #1: Brownie McGhee and Sonny Terry
artist #2: Brownie McGhee & Sonny Terry
path #1: "/Blues/Brownie McGhee and Sonny Terry/Brownie McGhee and Sonny Terry Sing"
path #2: "/Blues/Brownie McGhee & Sonny Terry/At the 2nd Fret
Warning: possible mistyped artist
artist #1: Saffire—The Uppity Blues Women
artist #2: Saffire—The Uppity Blues Women
path #1: "/Blues/Various/Alligator Records—30th Anniversary Collection (Disk 2 of 2)—On the Stage"
path #2: "/Christmas/Various/Christmas Collection"
Warning: possible mistyped artist
artist #1: Booker T. & the MG's
artist #2: Booker T & The MG's
path #1: "/Blues/Booker T. & the MG's/The Very Best of Booker T. & the MG's"
path #2: "/Soundtrack/Various/Northern Exposure"
Warning: possible mistyped artist
artist #1: AC-DC
artist #2: AC/DC
path #1: "/Rock/AC-DC/LIVE"
path #2: "/Rock/AC_DC/Who Made Who (Remastered)"
Warning: possible mistyped artist
artist #1: J J Johnson
artist #2: J. J. Johnson
path #1: "/Jazz/J_J_ Johnson/The Eminent Jay Jay Johnson, Vol_ 2"
path #2: "/Jazz/J_J_Johnson/The Eminent Jay Jay Johnson, Volume 1"

Example Report F

Detect Possible Duplicate Artists

Warning: Clarence 'Gatemouth' Brown
match: Clearence 'Gatemouth' Brown
Warning: Diane Reeves
match: Dianne Reeves
Warning: Hilary Duff
match: Hillary Duff
Warning: The Jackson 5
match: Jackson Five
Warning: Les Baxter
match: Lex Baxter
Warning: Lynyrd Skynyd
match: Lynyrd Skynyrd
Warning: Safhire—The Uppity Blues Women
match: Saffire—The Uppity Blues Women
Warning: Sarced Harp Singers At Liberty Church
match: Sacred Harp Singers At Liberty Church

Example Report G

Detect Transposed Track/Artist or Compilation Albums

Warning: multiple tracks match artists, possible compilation, mixed up track/performer?
track: Steve Earle/Pancho And Lefty
track: Steve Earle/White Freightliner Blues
track: Steve Earle/Colorado Girl
track: Steve Earle/Where I Lead Me
track: Steve Earle/Lungs
track: Steve Earle/No Place To Fall
track: Steve Earle/Loretta
track: Steve Earle/Brand New Companion
track: Steve Earle/Rake
track: Steve Earle/Delta Mama Blues
track: Steve Earle/Marie
track: Steve Earle/Don't Take It To Bad
track: Steve Earle/Mr. Gold And Mr. Mud
track: Steve Earle/(Quicksiver Daydreams Of) Maria
track: Steve Earle/To Live Is To Fly
path: "/Folk/Steve Earle/Townes
Warning: multiple tracks match artists, possible compilation, mixed up track/performer?
track: I've Got U Under My Skin (Neneh Cherry)
track: In The Still Of The Night (Neville Brothers)
track: You Do Something To Me (Sinéad O'Connor)
track: Begin The Beguine (Salif Keita)
track: Love For Sale (Fine Young Cannibals)
track: Well Did You Evah? (Debbie Harry & Iggy Pop)
track: Miss Otis Regrets, Just One Of Those Things (Kirsty MaColl And The Pogues)
track: Don't Fence Me In (David Byrne)
track: It's All Right With Me (Tom Waits)
track: Ev'rytime We Say Goodbye (Annie Lennox)
track: Night and Day (U2)
track: I Love Paris (Les Negresses Vertes)
track: So In Love (K. D. Lang)
track: Who Wants To Be A Millionaire (Thompson Twins)
track: Too Darn Hot (Erasure)
track: I Get A Kick (Jungle Brothers)
track: Down In The Depths (Lisa Stansfield)
track: From This Moment On (Jimmy Somerville)
track: After You Who (Jody Watley)
track: Do I Love You (Aztec Camera)
path: "/Rock/Various/Red Hot+Blue Tribute to Cole Porter
Warning: multiple tracks match artists, possible compilation, mixed up track/performer?
track: Andonis Dalgas—Sousta politiki
track: Agapios Tomboulis—Horos dervishikos
track: Yiannis Tsanakas—Rast gazel
track: Roza Eskenazi—Ime prezakias (tsifte telli)
track: Markos Vamvakaris—Taxim (zembekiko)
track: Hatzichristos—Tsitsanis—I xenitia
track: Stratos & Keromitis—Baglamadhes
track: Ioannis Papaioannou—Glendi ke horos (serviko)
track: Rita Abatzi—O psilos (zeimbekiko)
track: Jack Gregory—Minore tou deke
track: Ogdhondakis—Diplochordo tsifte telli
track: Marika Papagika—Ta kommena to malia sou (tsifte telli)
track: George Macreyannis—Zeimbekiko aivaleotiko
track: Marika Kanaropoulou—Manes tsfite telli
track: George Katsaros—Mes'tou Manthou ton teke
track: Kalivopoulos—Tsaous—I Eleni i zontohira
track: Markos Vamvakaris—Syros (zeimbekiko)
track: Stratos Pagioumitzis—Opios orfanepse mikros
track: Lambros Leondaridhis—Taxim hetzaskiar kiurdi
track: Yiangos Psamatianos—Manes Chiotikos
path: "/World/Various/Remb+¬tika—Historic urban folk songs from Greece
Warning: multiple tracks match artists, possible compilation, mixed up track/performer?
track: (Conrad Pope) Truffles And Quail
track: (Michael Buble) Sway
track: (Luciano Pavarotti) Celeste Aida
track: (Renata Tebaldi) O mio babbino caro
track: (Philip Glass) Zoe and Kate Watch Video
track: (Joan Sutherland and Carlo Bergonzi) Libiamo ne' lieti calici
track: (Paolo Conte) Via con me
track: (Joseph Calleja) La donna 'e mobile
track: (Renata Tebaldi) Un bel di
track: (Philip Glass) Zoe Goes To The Restaurant
track: (Luciano Pavarotti) Cielo e mar
track: (Ray Gelato) Mambo Gelato
track: (Luciano Pavarotti) Nessun dorma
track: (Liz Phair) Count on My Love
path: "/Soundtrack/Various/No Reservations

Example Report H

Detect Artists in Multiple Genres

Warning: Artist in multiple genres: "The Jackson 5" (Disco, Rock,)
Warning: Artist in multiple genres: "Ruth Brown" (Blues, R&B,)
Warning: Artist in multiple genres: "Nina Simone" (Blues, Jazz,)
Warning: Artist in multiple genres: "Armand van Helden" (Dance, House,)

Example Report I

Compare Combination of Artist Name and Album with Other Albums

Warning: Possible duplicate cue files with similar artist/album:
path #1: " . . . /Rock/John Mayer/Where The Light Is, CD_1
path #2: " . . . /Rock/John Mayer/Where The Light Is (CD 1)

What is claimed is:
1. A computer-implemented method, comprising:
   accessing a directory containing music files, the music files having metadata associated therewith;
   accessing the metadata associated with the music files;
   for the metadata associated with the music files, performing the following operations:
   checking the metadata for an artist name in a "last name, first name" format;
   checking the metadata for a mixed up track title and artist name;
   checking the metadata for artists that appear in multiple genres;
   using approximate string matching, checking the metadata to identify potential matches for known artists with other known artists in a reference database; and
   using approximate string matching, checking a combination of the artist name and an album in the metadata for approximate matches, wherein a report is generated when one of the operations identifies an error or inconsistency in the metadata; and generating a report of a final list of all unique artists and all unique albums found in the metadata associated with the music files.

2. The computer-implemented method of claim 1, wherein the method further comprises:
checking a binary checksum of raw media data in the music files for duplicates and generating a report of any duplicates found.

3. The computer-implemented method of claim 2, wherein the method further comprises:
detecting missing auxiliary metadata associated with the music files and generating a report if any missing auxiliary metadata is detected.

4. The computer-implemented method of claim 3, wherein the missing auxiliary metadata includes a cover art image for an album folder.

5. The computer-implemented method of claim 3, wherein the method further comprises:
detecting formatting issues within the metadata for the music files and generating a report identifying any formatting issues detected.

6. The computer-implemented method of claim 5, wherein the method further comprises:
using a set of string transformations to compare two non-equivalent strings.

7. The computer-implemented method of claim 5, wherein the method further comprises:
comparing the metadata for a music file to a location of the music file in a file system.

8. The computer-implemented method of claim 7, wherein the method further comprises:
collecting the metadata for the music files for analysis.

9. One or more non-transitory computer-readable media storing a program which, when executed, instructs a processor perform the following operations:
access a directory containing music files, the music files having metadata associated therewith;
access the metadata associated with the music files;
for the metadata associated with the music files, perform the following operations:
check the metadata for an artist name in a "last name, first name" format;
check the metadata for a mixed up track title and artist name;
check the metadata for artists that appear in multiple genres;
use approximate string matching to check the metadata to identify potential matches for known artists with other known artists in a reference database; and
use approximate string matching to check a combination of the artist name and an album in the metadata for approximate matches, wherein a report is generated when one of the operations identifies an error or inconsistency in the metadata; and
generate a report of a final list of all unique artists and all unique albums found in the metadata associated with the music files.

10. The computer-readable media of claim 9, wherein the operations further comprise:
checking a binary checksum of raw media data in the music files for duplicates and generating a report of any duplicates found.

11. The computer-readable media of claim 10, wherein the operations further comprise:
detecting missing auxiliary metadata associated with the music files and generating a report if any missing auxiliary metadata is detected.

12. The computer-readable media of claim 11, wherein the missing auxiliary metadata includes a cover art image for an album folder.

13. The computer-readable media of claim 11, wherein the operations further comprise:
detecting formatting issues within the metadata for the music files and generating a report identifying any formatting issues detected.

14. The computer-readable media of claim 13, wherein the operations further comprise:
using a set of string transformations to compare two non-equivalent strings.

15. The computer-readable media of claim 13, wherein the operations further comprise:
comparing the metadata for a music file to a location of the music file in a file system.

16. The computer-readable media of claim 15, wherein the operations further comprise:
collecting the metadata for the music files for analysis.

17. A computer-implemented method, comprising:
accessing a directory containing music files, the music files having metadata associated therewith;
checking raw media data in the music files for duplicates and generating a report of any duplicates found;
detecting missing auxiliary metadata associated with the music files and generating a report if any missing auxiliary metadata is found;
detecting formatting issues within the metadata for the music files and generating a report identifying any formatting issues detected;
comparing the metadata for a music file to a location of the music file in a file system and generating a report if any errors or inconsistencies are found; and
collecting the metadata for the music files for analysis;
accessing the metadata collected for analysis;
for the metadata associated with the music files, checking the metadata, using approximate string matching, to identify potential matches for known artists with other known artists in a reference database; and
generating a report of a final list of all unique artists and all unique albums found in the metadata associated with the music files.

18. The computer-implemented method of claim 17, wherein the checking of the raw media data in the music files for duplicates includes checking a binary checksum of the raw media data in the music files for duplicates.

19. The computer-implemented method of claim 17, wherein the method further comprises performing the following operations for the music files:
checking the metadata for an artist name in a "last name, first name" format;
checking the metadata for a mixed up track title and artist name; and
checking the metadata for artists that appear in multiple genres.

20. The computer-implemented method of claim 19, wherein a report is generated when one of the checking operations identifies an error or inconsistency in the metadata.

* * * * *